Feb. 25, 1969 J. M. Y. LE CLERC DE BUSSY 3,429,972
VERY HIGH TEMPERATURE ELECTRIC MELTING FURNACE
Filed March 20, 1967

INVENTOR:
Jacques Marie Yves
LE CLERC DE BUSSY by: Jaclattre-Seguy
Attorney

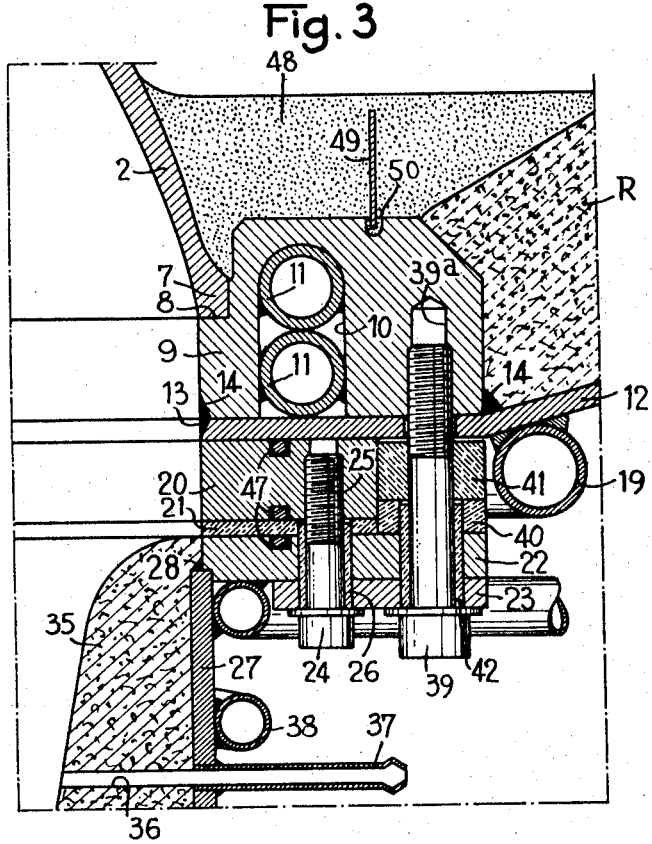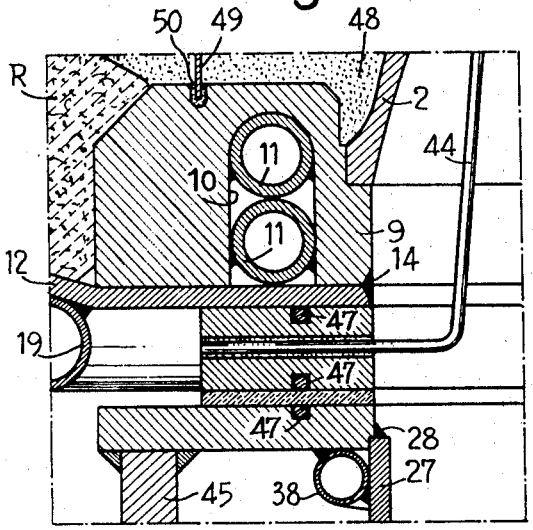

United States Patent Office 3,429,972
Patented Feb. 25, 1969

3,429,972
VERY HIGH TEMPERATURE ELECTRIC
MELTING FURNACE
Jacques Marie Yves le Clerc de Bussy, Paris, France,
assignor to Verreries Pochet et du Courval, Paris,
France
Filed Mar. 20, 1967, Ser. No. 624,252
Claims priority, application France, Mar. 25, 1966,
54,965
U.S. Cl. 13—6       9 Claims
Int. Cl. C03b 5/00, 5/02

ABSTRACT OF THE DISCLOSURE

Melting furnace employing very high temperatures in which the extracting means in the lower part of the vessel of the furnace comprises a centre electrode bearing on an element in the form of a cylindrical skirt including a flow passageway, said elements being of molybdenum protected from oxidation by reducing gas filling a cavity and by the molten product in the vessel of the furnace.

The present invention relates to electric melting furnaces of the type having a very high temperature gradient inside the melting vessel between the centre zone and the peripheral zone of this vessel, the temperature in the centre being higher than the temperature at the periphery. Furnaces of this type are described in particular in French Patents Nos. 1,206,771 and 1,297,789 and the Patent of Addition to the latter.

The furnace described in the aforementioned patents and patent of addition is capable of producing molten glasses up to temperatures of about 1,650° C., the latter limit being determined above all by the means for extracting the molten material. Indeed, in this furnace this means is composed of molybdenum protected by a sleeve of platino-rhodium which performs the following functions: it protects the molybdenum from oxidation, it protects the refractory elements of the furnace from corrosion by the molten material (generally glass) and it forms a pouring aperture in the lower part thereof.

The platino-rhodium alloy is a refractory material utilizable up to a temperature of about 1600–1650° C. The furnace described in the aforementioned patents is therefore incapable of producing materials above this temperature.

The object of the invention is to provide an improvement in this type of furnace concerning in particular the possibility of extracting products at temperatures in the neighbourhood of 2000° C. These products can be vitreous or crystalline products for example.

The furnace according to the invention is of the type having inside the vessel a very high temperature gradient between the centre zone and the outer zone and comprising means for extracting the molten product on the axis of the vessel.

In this furnace, said extracting means comprises a flow passageway composed of a highly refractory metal and a cavity communicating with the interior of the vessel by way of the flow passageway for the molten product and with the exterior of the furnace by way of a constricted passageway through which the molten product passes, said cavity being filled with a reducing gas continuously supplied to said cavity and escaping at the same time as the stream of molten product passes through said constricted passageway.

According to another feature of the invention, said extracting means defines an annular zone in said vessel which surrounds the extracting means and is filled with a glass of a density higher than that of the molten product, a sleeve being embedded in said high-density glass and having an axis coinciding with the axis of said zone, said sleeve being brazed to the bottom of said zone.

Further features and advantages of the invention will be apparent from the ensuing description with reference to the accompanying drawings.

Figure 1:
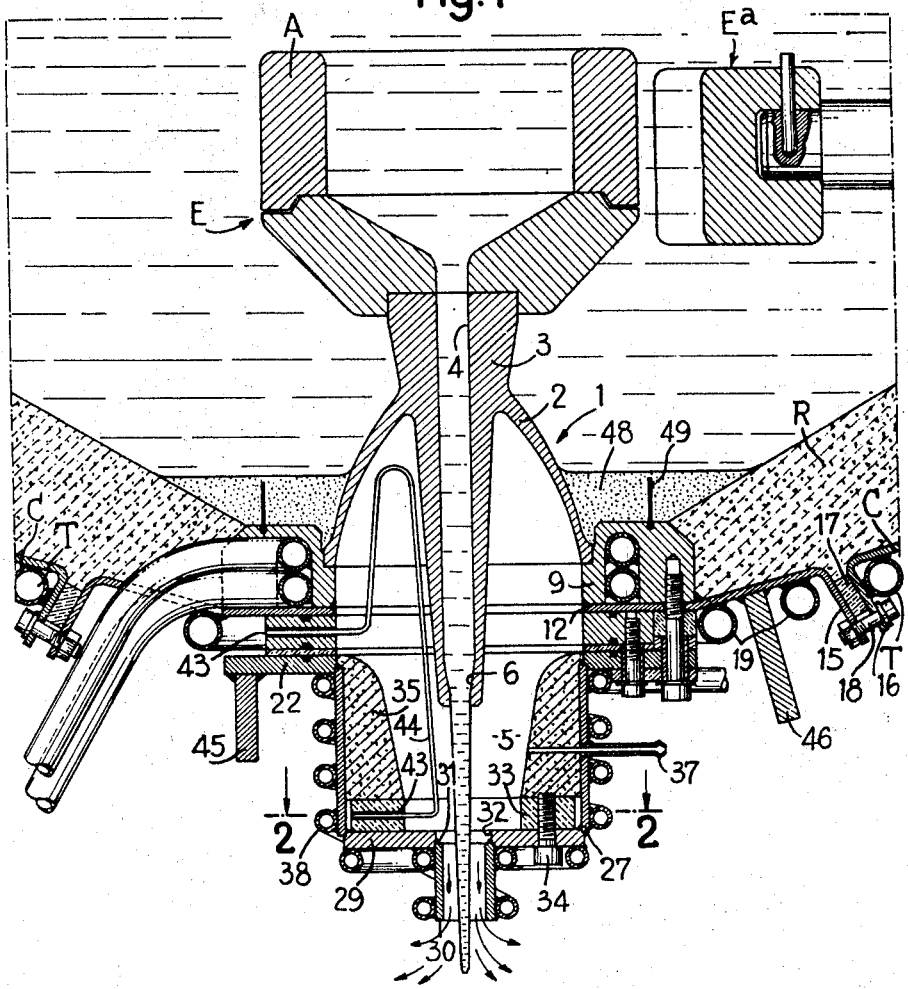
Figure 2:
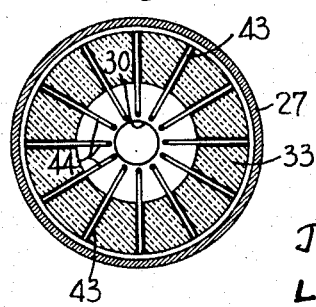

In the drawings:
FIG. 1 is a partial sectional view of an improved electric melting furnace according to the invention, especially the extracting means being shown;
FIG. 2 is a sectional view taken along line 2—2 of FIG. 1, and
FIGS. 3 and 4 are sectional views showing two parts of the extracting means in detail.

According to the embodiment shown in FIGS. 1–4, an electric melting furnace comprises a vessel C of copper. This vessel is suitably suspended from a support (not shown) and has on its outer face copper cooling tubes T in which a cooling liquid can flow.

The furnace is provided with heating electrodes $E^a$, $E^b$, $E^c$ which are radially disposed about a centre electrode E and angularly spaced 120° apart. These electrodes supply electric energy to the centre of the furnace. The centre electrode E is supplied with a refining device A.

The inner surface of the vessel C is covered with a refractory lining R.

All these details of furnace are known and described in the aforementioned patents.

According to the invention, this furnace is provided with extracting means generally designated by the reference numeral 1. This means comprises at its upper part a skirt 2 of highly refractory material for example of molybdenum or tungsten. This skirt is in one piece with an elongated portion or rod 3 whose axis coincides with the axis of the skirt 2 and the vertical axis of the furnace. The portion 3 contains a flow passageway 4 which connects the refining device A to the space or cavity 5 described hereinafter. The flow passageway 4 terminates at its lower end in a conical aperture 6. The elongate portion 3 is so arranged as to support the electrode E and the refining device A.

The skirt 2 comprises a lower reinforced edge 7 (FIG. 3) which bears on an annular shoulder 8 on a ring 9 of for example copper. The ring 9 is concentric with the axis of the furnace and has a recess 10 in which is disposed and brazed cooling tubes 11 in which a cooling liquid flows. The ring 9 bears on a base plate 12 which is in the form of a tray and has an opening 13 whose diameter is the same as the inside diameter of the ring 9. The latter is secured to the plate 12 by brazing 14.

The plate 12 comprises a flange 15 (FIG. 1) on its periphery which cooperates with a coaxial flange 16 on the vessel C and is electrically insulated from the latter by a seal 17. Screw and nut assemblies 18 electrically insulated from the plate 12 and from the vessel C renders this structure rigid.

The plate 12 is cooled by means of brazed tubes 19 which communicate with the cooling circuit of the furnace by way of electrically insulating tubes (not shown) composed for example of rubber.

The assembly comprising the centre electrode E, the refining device A and the skirt 2 is thus integral with the vessel C which is itself carried by a support (not shown).

The lower part of the extracting means comprises (FIGS. 3 and 4) a pole-mass 20 in the form of a ring, a flattened insulating ring 21, a base plate 22 and an insulating plate 23.

These various members are in stacked relation and interconnected by means of bolts 24 which extend through the plates 23, 24 and the insulating ring 21. Screwthreads formed in apertures 25 in the pole-mass 20 are engaged with these bolts, the assembly thus achieved having an annular shape and being coaxial with the vessel C.

The bolts 24 are electrically insulated from the plate 22 by means of sleeves 26 and plates 23 both of which are electrically insulating.

The lower part of the extracting means further comprises a sleeve 27 which is of for example copper and welded to the base plate 22 at 28 in axial alignment with the skirt 2. An end plate 29 (FIG. 1) is welded to another copper sleeve 30 and fixed to the lower edge of the sleeve 27. The sleeve 30 constitutes the throttling or constricted passageway through which the stream of molten product passes without touching the sleeve whereas the reducing gas flows between the sleeve 30 and the stream of molten product. The end plate 26 has an aperture 32 which provides the same passage for the stream of glass.

A second pole-mass 33 of copper is connected to the end plate 29 by means of bolts 34. Further, a downwardly convergent conical member composed of aluminium, which is heat insulating, is disposed within the sleeve 27.

The sleeve 27 and the conical member 35 have a radial pasageway 36 which communicates with a reducing gas supply pipe 37.

The whole of the lower part of the extracting means is cooled by a cooling circuit comprising tubes 38 brazed to the sleeve 27, this circuit communicating with the main cooling circuit of the furnace.

The whole of the lower part of the extracting means is attached to the upper part by means of bolts 39, these bolts extend through the plates 22 and 23, insulating gaskets 40 and 41 and the base plate 12. They are screwed into blind tapped holes 39a in the ring 9. Insulating sleeves 42 surround the bolts 39 so as to electrically insulate them from the plate 22.

As can be seen better in FIG. 2, the pole-masses 20 and 23 are provided with radial apertures 43 in which are inserted respectively the ends of a plurality of resistances 44 which have a "hair pin" shape and are disposed in radial planes intersecting the axis of the furnace.

These resistances are preferably of molybdenum and are supplied with electric current by two conductors (not shown) which are respectively fixed to current supply bars of which the bar 45 is welded to the base plate 22 and the other 46 to the plate 12.

The circuit of these resistances is therefore composed of the following elements: bar 45, plate 22, sleeve 27, end plate 29, pole-mass 33, resistances 44, pole-mass 20, plate 12 and bar 46.

The seal between the plate 12 and the mass 20, between the latter and the insulating ring 21 and between the latter and the plate 22 is achieved by means of sealing elements 47 disposed in corresponding grooves.

At the bottom of the vessel C the skirt 2 is surrounded by a glass zone 48 defined by the refractory material R and the cooled copper ring 9, the glass in this zone having a density distinctly higher than that of the material in the molten state inside the furnace.

Embedded in this glass zone 48 is a platinum sleeve 49 which is coaxial with the skirt 2 and brazed in a groove 50 provided in the upper face of the ring 9.

The space or cavity 5 inside the above-described extracting means is filled with a reducing gas, for example hydrogen ($H_2$) which is supplied by way of the pipe 37 and the aperture 36. This gas escapes from the constricted passageway sleeve 30 at the same time as the molten product in the furnace downwardly flowing through the passageway 4 and the sleeve 30. The burnt gas escapes as soon as it is in the presence of oxygen at the outlet of the sleeve 30.

Filling the space or cavity 5 with reducing gas is necessary to prevent the oxidation of the refractory metal (in this case molybdenum which very easily oxidizes in air) of the skirt 2, the rod 3 and the resistances 44.

The arrangement according to the invention prevents any contact between the surrounding air and the members composed of this refractory material. The upper part of the molybdenum skirt 2 is protected by the molten mass in the vessel C and the reducing gas in the cavity 5 has a pressure slightly greater than the pressure outside the furnace and precludes any introduction of air into the cavity 5.

Further, sealing elements 47 provide an air seal for the lower part of the extracting means.

The arrangement according to the invention also protects the metal parts against penetration of molten material in the furnace. For this purpose, a cooling circuit is provided comprising the tubes 11 which are brazed to the ring 9 and cool the latter. The material of high density located in the zone 48 therefore cannot melt and remains set in the annular base around the skirt 2. It is therefore possible to construct the ring 9 of copper since it is never in contact with the molten material during the operation of the furnace.

Although this arrangement seals off the surrounding air that might enter owing to clearances in the assembly, the sleeve 49 is provided.

This sleeve of platinum affords a barrier preventing any contact of air with the skirt 2 of molybdenum. The high temperature of the molten mass indeed softens the upper zone of the glass 48 so that the molten material reaches the upper edge of the sleeve 49 and thus affords the seal. The air cannot pass through the barrier constituted by the sleeve 49, the brazing of the latter and the pasty glass 48 in contact with the sleeve.

The furnace is started up in the following manner:

The space or cavity 5 is filled with a reducing gas, for example hydrogen, and the jet of gas is ignited when the latter starts to flow through the sleeve 30. Thereafter, the conventional operations of starting up are carried out, namely the filling of the material, the pre-heating by means of a blow-pipe and the starting up of the electrodes E, $E^a$, $E^b$ and $E^c$. When the furnace operates at full power, a voltage is applied between the bars 45 and 46 and the resistances 44 are heated to 2000° C. for example.

The flow passageway 4, 6 is then heated to a white heat and the material therein softens and then flows and thus initiates the flow of the molten material located in the vessel C. The stream of molten product then reaches the exterior of the furnace in passing through the sleeve 30. When a regular flow is achieved, the electric supply to the resistances 44 is cut off.

It should be mentioned that the refractory material 35 is composed of insulating aluminium. This member 35 encourages the heating of the material in the passageway 4 when the resistances 44 are supplied with current.

It will be clear from the preceding description that this extracting means, and consequently the furnace of which it is part, can be employed at extremely high temperatures (on the order of 2000° C.) while suitably protecting against oxidation of the highly refractory metals employed.

Although a specific embodiment of the invention has been described, many modifications and changes may be made therein without departing from the scope of the invention as defined in the appended claims.

Having now described my invention what I claim as new and desire to secure by Letters Patent is:

1. An electric melting furnace comprising a vessel having a substantially vertical axis, a centre electrode on said axis, a series of electrodes disposed inside the vessel radially about said centre electrode, said centre electrode having means for extracting the molten product, said furnace having inside the vessel a very high temperature gradient between a centre zone and an outer zone, said extracting means comprising a flow passageway for the molten product issuing from the vessel and composed of a highly refractory metal, a cavity communicating with the interior of the vessel by way of said flow passageway for the molten product, a constricted passageway through which said cavity communicates with the exterior of the furnace and through which the molten product passes, a reducing gas in said cavity, and means for continuously supplying said gas to said cavity, said gas escaping from said cavity at the same time as the stream of molten product through said constricted passageway.

2. A furnace as claimed in claim 1, wherein said refractory material is molybdenum.

3. A furnace as claimed in claim 1, wherein said refractory material is tungsten.

4. A furnace as claimed in claim 1, wherein said reducing gas is hydrogen.

5. A furnace as claimed in claim 1, wherein said extracting means comprises in the upper part thereof a cylindrical skirt which supports said centre electrode, the skirt having a lower edge, a cooled ring fixed to the base of the furnace and supporting said lower edge of the skirt, an axial rod portion integral with said skirt extending downwardly inside the skirt and containing said flow passageway, the skirt and the rod portion being composed of a highly refractory material, and said flow passageway being in axial alignment with said constricted passageway.

6. A furnace as claimed in claim 1, comprising electric resistances located inside said cavity in vertical planes around said flow passageway for heating the flow passageway when starting up said furnace.

7. A furnace as claimed in claim 6, wherein said resistances are of molybdenum.

8. A furnace as claimed in claim 6, comprising two conductive rings in which said resistances are fixed and which are insulated from each other, connected to a source of current and disposed coaxially of said axis of the furnace.

9. A furnace as claimed in claim 6, wherein said inner cavity of the extracting means is defined by a wall which is partially covered with a lining of refractory aluminum which encourages the heating of said flow passageway when said resistances are supplied with current.

References Cited
UNITED STATES PATENTS

| | | | |
|---|---|---|---|
| 2,294,373 | 9/1942 | Batchell | 13—6 |
| 2,350,829 | 6/1944 | Scharfnagel | 13—6 X |
| 2,830,107 | 4/1958 | Hahn et al. | 13—6 |
| 2,790,019 | 4/1957 | Stalego | 13—33 |
| 3,147,328 | 9/1964 | De Bussy | 13—6 |

BERNARD A. GILHEANY, *Primary Examiner.*

HIRAM B. GILSON, *Assistant Examiner.*

U.S. Cl. X.R.

13—3, 33